United States Patent [19]

Miyashita et al.

[11] Patent Number: 4,676,589

[45] Date of Patent: Jun. 30, 1987

[54] OPTICAL FIBER COUPLER FOR CONNECTING TWO OPTICAL CABLES IN ALIGNMENT

[75] Inventors: Hidekazu Miyashita, Kitamoto; Ryoji Maruyama, Ageo, both of Japan

[73] Assignee: Dai-Ichi Sekio Kabushiki Kaisha, Kawaguchi, Japan

[21] Appl. No.: 690,627

[22] Filed: Jan. 11, 1985

[30] Foreign Application Priority Data

Nov. 12, 1984 [JP] Japan .................. 59-237849

[51] Int. Cl.⁴ .............................. G02B 6/38
[52] U.S. Cl. .............................. 350/96.21
[58] Field of Search ...................... 350/350

[56] References Cited

U.S. PATENT DOCUMENTS 3,880,452 4/1975 Fields ............. 350/96.22 X
4,087,158 5/1978 Lewis et al. ........ 350/96.21

FOREIGN PATENT DOCUMENTS 2759002 7/1979 Fed. Rep. of Germany ... 350/96.21
56-11046 3/1981 Japan .
0057016 5/1981 Japan .................. 350/96.2
58-04084 1/1983 Japan .
2043943 10/1980 United Kingdom ........ 350/96.2

Primary Examiner—John Lee
Attorney, Agent, or Firm—Cushman, Darby & Cushman

[57] ABSTRACT

An optical fiber coupler comprising a cylindrical fiber holder made of plastics, having a through bore of a size just capable of receiving an optical fiber to be connected and having a portion divided along the through bore in the middle range; a pair of flexible conical collars each of which is engaged with the end portion of the fiber holder and has a bore aligned with the through bore and a slit extending in the lengthwise direction; a cylindrical sleeve fitted on the cylindrical fiber holder to cover the fiber holder and having screw portions at both ends; and a pair of caps each of which is screwed with screw portion of the sleeve to grasp the optical fiber portion passing through the collar with the collar; and an opening aligned with the bore on its end wall, in order to enable to simplify the structure, to make small the entire size, to manufacture at a low cost and to assemble within a short time.

10 Claims, 6 Drawing Figures

OPTICAL FIBER COUPLER FOR CONNECTING TWO OPTICAL CABLES IN ALIGNMENT

BACKGROUND OF THE INVENTION

1. Field of the Invention

This invention relates to an optical fiber coupler for connecting two optical fibers with each other.

2. Description of the Prior Art

There are already known fiber couplers of this kind of various formations. However, in the case of any of them, there have been such problems that the structure is complicated, the entire coupler is large, the assembly is difficult and takes time and the cost is high.

SUMMARY OF THE INVENTION

Therefore, the object of the present invention is to provide an optical fiber coupler which is simple and small in structure, can be made at a low cost and can be assembled within a short time.

This object is attained by an optical fiber coupler characterized by comprising a hollow cylindrical sleeve provided at both ends with screw portions; a fiber holder inserted and fitted in said sleeve, provided with a through bore which is a groove of a size just capable of receiving an optical fiber to be connected in the middle range along the center axis, is a bore of a size larger than of said groove on each side of said middle range and is tapered to expand at both ends, divided along the above mentioned groove in the middle range of said through bore and made to be cylindrical, for example, of a plastic, two collars each of which is so arranged as to contact on its compensating conical outer surface with the tapered end portion of the through bore of said fiber holder, is provided in the center with a bore of substantially the same diameter as of the outer coating of the optical fiber, has at least one slit formed to extend in the lengthwise direction to reach the inner surface of the bore from the outer surface and is made of a flexible material; and two hollow cylindrical caps each of which is screwed with the screw portion of the sleeve so as to press said collar against the tapered end portion of the fiber holder with its rotation, is closed at the outer end and is provided at said outer end with an opening through which the outer coating of the optical fiber can pass.

This and other objects of the present invention will become more apparent during the course of the following detailed description and appended claims.

DESCRIPTION OF THE PREFERRED EMBODIMENTS

Figure 1:
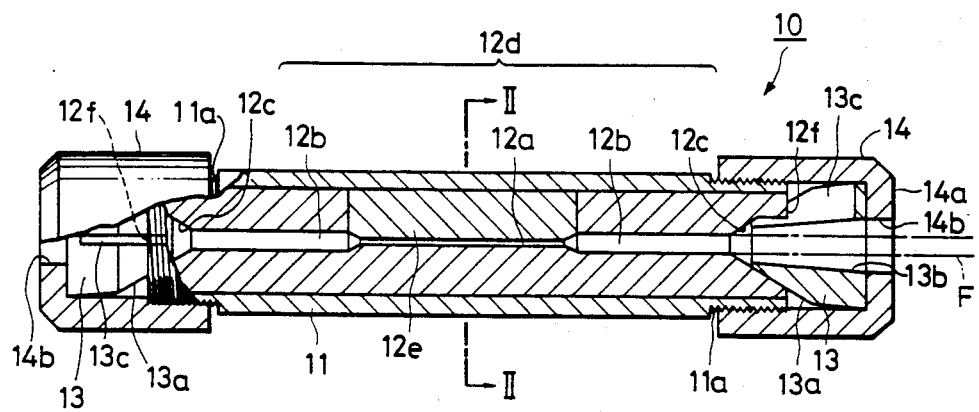
FIG. 1 is a partly sectioned side view showing an embodiment of the optical fiber coupler according to the present invention.
Figure 2:
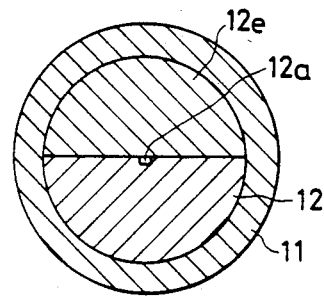
FIG. 2 is a sectioned view along line II—II in FIG. 1.

The present invention shall be explained in the following on the basis of embodiments shown in the drawings. In FIG. 1, the reference numeral 10 denotes an optical fiber coupler, 11 denotes a hollow cylindrical sleeve provided at both ends with screw portions 11a (male screws in the case of FIG. 1), 12 denotes a fiber holder fitted in said sleeve 11, made to be cylindrical, for example, of a plastic, provided with a through bore 12d which is a groove 12a of a size just capable of receiving an optical fiber F to be connected in the middle range along the center axis, is a bore 12b of a size larger than of said groove 12a on each side of said middle range and is a tapered end portion 12c tapered to expand at both ends and divided by an engaging member 12e along the groove 12a in the middle range of the through bore 12d (See FIG. 2), 13 denotes a collar which is so arranged as to contact on its conical outer surface 13a with the tapered end portion 12c of the through bore 12d of said fiber holder 12, is made of a flexible material, is provided in the center with a bore 13b of substantially the same diameter as of the outer coating of the optical fiber and has at least one slit 13c formed to extend in the lengthwise direction to reach the inner surface of the bore 13b from the outer surface 13a, and 14 denotes two hollow cylindrical caps each of which is screwed with the screw portion 11a at each end of the sleeve 11, is closed at the outer end 14a and is provided at said outer end with an opening 14b through which the outer coating of the optical fiber can pass so as to press the collar 13 against the tapered end portion 12c of the fiber holder with the rotation of said cap 14 with respect to the sleeve 11. By the way, the fiber holder 12 is provided in each tapered end portion 12c of the through bore 12d with a projection 12f engaging with one of the slits 13c of the collar 13 to prevent the collar 13 from being rotated when the cap 14 is rotated with respect to the sleeve 11.

As the embodiment of the present invention is formed as in the above, when the optical fibers F to be connected with each other are inserted at the tips into the through bore 12d of the fiber holder 12 with the engaging member 12e removed, are butted against each other and are jointed by any proper method (such as, for example, cementing or thermofusing), the engaging member 12e is fitted, then the fiber holder 12 is inserted into the sleeve 11, the respective collars 13 are contacted on the conical outer surface 13a with the tapered end portions 12c at both ends of the fiber holder 12 and then the caps 14 are fitted and rotated to be fastened in the axial direction along the screw threads, the collars 13 will be pressed against the tapered end portions 12c of the fiber holder 12, will be deformed at the tips of the conical outer surfaces 13a radially inward along said tapered end portion 12c so as to fasten the outer coatings of the optical fibers F and to fix the optical fibers F. At this time, as the lengthwise slits 13c are formed in the collars 13, the conical outer surface 13a will be able to be easily flexed radically inward and the projection 12f provided in said tapered end portion 12c will engage with one of said slits 13c to prevent the rotation of the collar 13 with respect to the fiber holder 12.

Thus, the optical fiber coupler according to the present invention is simple in the structure, can be easily made small, can be made at a low cost and can reduce the assembling time.

Figure 3:
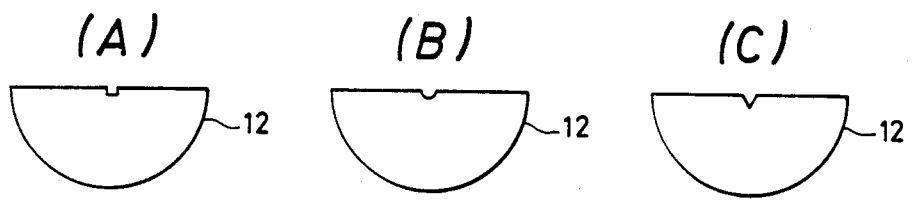
FIGS. 3A, 3B, and 3C show various cross-sectioned shapes of the groove in the through bore of the fiber holder.
Figure 4:
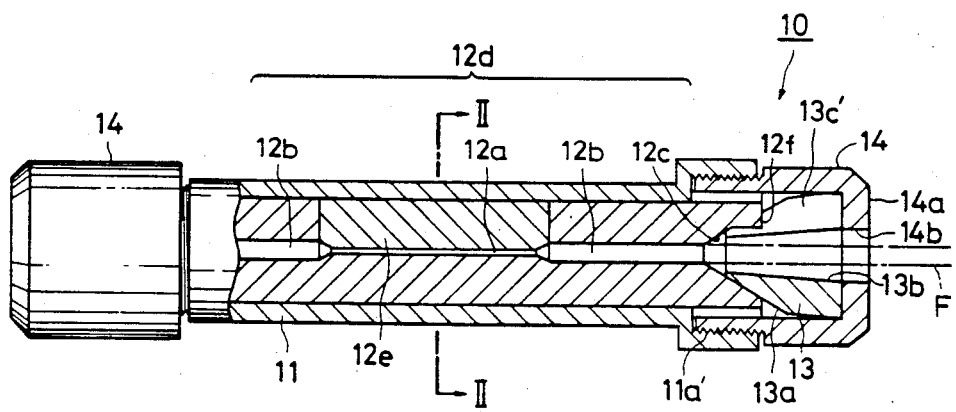
FIG. 4 is a partly sectioned side view showing another embodiment.

By the way, the groove 12a in the fiber holder 12 is of such size as can just receive the fiber F to be connected, the cross-sectioned shape of the groove may be any such as (A) circular, (B) semicircular or (C) V-shaped as shown in FIG. 3. Further, as shown in FIG. 4, the screw portion of the sleeve 11 may be formed as female screw 11a' to be screwed with the male screw formed on the outer peripheral surface of the cap 14 and the collar 13 may be divided into a plurality of component elements by at least two slits extending over its entire length.

What is claimed is:

1. An optical fiber coupler for an optical fiber having an outer coating, said coupler comprising a hollow, cylindrical sleeve provided at both ends with screw portions; a cylindrical fiber holder fitted in said sleeve and provided with a through bore along its center axis and having a central member which is removable to expose a groove of said bore with said groove having a size just capable of receiving an optical fiber to be connected, said through bore on each end of said groove being of a size larger than said groove and having on each end of said groove a tapered end portion extending radially outwardly; a pair of flexible collars each having conical outer surfaces and each of which is so arranged as to contact on said respective conical outer surface with the respective tapered end portion of said through bore, each said collar being provided in the center with a bore of substantially the same diameter as the outer coating of the optical fiber and having at least one slit formed to extend in a lengthwise direction to reach the inner surface of the bore from the outer surface of each said collar; said fiber holder having opposite end portions which are received in a respective slit of a respective said collar to prevent rotation of said collar; and a pair of hollow cylindrical caps, each of which is screwed with a screw portion so as to press a said collar against a respectively tapered end portion of said fiber holder to radially flex a said collar without rotation thereof thereby avoiding twisting of the optical fiber and each said cap being provided with an end wall having an opening through which the outer coating of the optical fiber can pass.

2. An optical fiber coupler according to claim 1 wherein said cylindrical fiber holder is made of plastics.

3. An optical fiber coupler according to claim 1 wherein the screw portions at both ends of said sleeve are of male screws.

4. An optical fiber coupler according to claim 1 wherein the screw portions at both ends of said sleeve are of female screws.

5. An optical fiber coupler according to claim 1 wherein the cross-sectional shape of said groove is rectangular.

6. An optical fiber coupler according to claim 1 wherein the cross-sectional shape of said groove is circular.

7. An optical fiber coupler according to claim 1 wherein the cross-sectional shape of said groove is semicircular.

8. An optical fiber coupler according to claim 1 wherein the cross-sectional shape of said groove is V-shaped.

9. An optical fiber coupler according to claim 1 wherein each said collar is divided into a plurality of component elements by at least two slits extending over its entire length.

10. An optical fiber coupler according to claim 1 wherein said fiber holder is provided in each tapered end portion of said through bore with a projection capable of engaging with said slit of each said collar.

* * * * *

UNITED STATES PATENT AND TRADEMARK OFFICE
CERTIFICATE OF CORRECTION

PATENT NO.    : 4,676,589

DATED         : June 30, 1987

INVENTOR(S)   : MIYASHITA, et al.

It is certified that error appears in the above-identified patent and that said Letters Patent is hereby corrected as shown below:    Title page:

In the Heading the Assignee is corrected to read as follows:

[73]   Assignee:   Dai-Ichi Seiko Kabushiki Kaisha,
                   Kawaguchi, Japan Signed and Sealed this Thirteenth Day of December, 1988

Attest:

DONALD J. QUIGG

*Attesting Officer*          *Commissioner of Patents and Trademarks*